(12) United States Patent
Kirsanov

(10) Patent No.: US 12,254,425 B1
(45) Date of Patent: Mar. 18, 2025

(54) UNIVERSAL SEARCH ENGINE FOR PRIVATE JET SERVICES

(71) Applicant: JetSmarter Inc., Fort Lauderdale, FL (US)

(72) Inventor: Mikhail Kirsanov, Fort Lauderdale, FL (US)

(73) Assignee: JetSmarter Inc., Fort Lauderdale, FL (US)

( * ) Notice: Subject to any disclaimer, the term of this patent is extended or adjusted under 35 U.S.C. 154(b) by 0 days.

(21) Appl. No.: 17/482,754

(22) Filed: Sep. 23, 2021

Related U.S. Application Data

(60) Provisional application No. 63/082,166, filed on Sep. 23, 2020.

(51) Int. Cl.
*G06Q 10/02* (2012.01)
*G06F 16/9538* (2019.01)
*G06Q 30/0601* (2023.01)

(52) U.S. Cl.
CPC ......... *G06Q 10/02* (2013.01); *G06F 16/9538* (2019.01); *G06Q 30/0641* (2013.01)

(58) Field of Classification Search
CPC ..................................................... G06Q 10/02
See application file for complete search history.

(56) References Cited

U.S. PATENT DOCUMENTS

| | | | | |
|---|---|---|---|---|
| 8,788,303 B1* | 7/2014 | Krone | ..................... | G06Q 10/02 705/5 |
| 2001/0054020 A1* | 12/2001 | Barth | ................. | G06Q 30/0625 705/37 |
| 2004/0078252 A1* | 4/2004 | Daughtrey | .......... | G06F 16/2428 705/5 |
| 2004/0230451 A1* | 11/2004 | Figa | ........................ | G06Q 10/02 705/5 |
| 2004/0267580 A1* | 12/2004 | Becker | ................... | G06Q 10/02 705/5 |
| 2006/0247954 A1* | 11/2006 | Hunt | ...................... | G06Q 10/04 705/5 |

(Continued)

OTHER PUBLICATIONS

Hemphilly Ever After; "How to Use the Hopper App | Hopper Run Through and Review"; published Aug. 18, 2020; Youtube.com; screenshot pp. 1-3, video timestamps 0:40 thru 1:28; https://www.youtube.com/watch?v=IjXOM2pRgFs (Year: 2020).*

*Primary Examiner* — Resha Desai
*Assistant Examiner* — Michael C Moroney
(74) *Attorney, Agent, or Firm* — Fish & Richardson P.C.

(57) ABSTRACT

This document describes a universal search engine. In one aspect, a method includes receiving, from a client device, a query that includes a departure geographic identifier and a destination geographic identifier for a private jet route. A set of available private jets for creating a new client-initiated private jet segment from the departure geographic location to the destination geographic location is selected for a given time period. One or more available spots on existing shared private jet segments that are scheduled to travel from the departure geographic location to the destination geographic location are identified for the time period. A user interface at the client device is updated to present one of, for each available private jet, a first required amount for creating a client-initiated private jet charter segment, or, for each available spot, a second required amount for claiming the spot.

20 Claims, 5 Drawing Sheets

(56) References Cited

U.S. PATENT DOCUMENTS

| | | | |
|---|---|---|---|
| 2008/0281644 A1* | 11/2008 | Payne | G06Q 10/02 |
| | | | 705/5 |
| 2009/0119135 A1* | 5/2009 | Schoeman | G06Q 50/40 |
| | | | 705/5 |
| 2014/0180733 A1* | 6/2014 | Rotchin | G06Q 10/02 |
| | | | 705/5 |
| 2015/0058050 A1* | 2/2015 | Tebourbi | G06Q 10/02 |
| | | | 705/5 |
| 2015/0287119 A1* | 10/2015 | Bhan | G06Q 30/0629 |
| | | | 705/5 |
| 2017/0124489 A1* | 5/2017 | Leavitt | G06Q 10/02 |
| 2018/0174075 A1* | 6/2018 | Manoharan | G06T 11/206 |
| 2019/0034989 A1* | 1/2019 | Hendrickson | G06Q 30/0641 |
| 2019/0287035 A1* | 9/2019 | Oleyarsh | G06F 3/0482 |
| 2020/0065920 A1* | 2/2020 | Cohen | G06Q 30/0214 |
| 2021/0304264 A1* | 9/2021 | Chute | G06Q 30/0283 |
| 2022/0245741 A1* | 8/2022 | Fisher | G06F 16/22 |

\* cited by examiner

UNIVERSAL SEARCH ENGINE FOR PRIVATE JET SERVICES

CROSS REFERENCE TO RELATED APPLICATION

This application claims the benefit under 35 U.S.C. § 119(e) of U.S. Application Ser. No. 63/082,166, titled "UNIVERSAL SEARCH ENGINE," filed Sep. 23, 2020, the entire contents of which are incorporated herein by reference.

BACKGROUND

This specification relates to data processing and user interfaces.

Historically, automated systems used to search for travel between an origin and a destination have been limited to (i) commercial public options in which individual spots (e.g., seats) are acquired by anyone and (ii) private options in which all spots in an aircraft or other mode of transport are acquired together by an individual. In both approaches, the users searching for such flights had very limited options, such as selecting an available seat on an existing flight or reserving a charter of an entire aircraft between two cities.

SUMMARY

In general, one innovative aspect of the subject matter described in this specification can be embodied in methods that include receiving, from a client device, a query that includes a departure geographic identifier and a destination geographic identifier for a private jet route, wherein the departure geographic identifier identifies a departure geographic location from which a private jet will depart and the destination geographic identifier identifies a destination geographic location at which the private jet will arrive; selecting, for a given time period, a set of available private jets for creating a new client-initiated private jet segment from the departure geographic location to the destination geographic location; identifying, for the given time period, one or more available spots on existing shared private jet segments that are scheduled to travel from the departure geographic location to the destination geographic location; and updating a user interface at the client device to present one of: for each available private jet, a first required amount for creating a client-initiated private jet charter segment to travel from the departure geographic location to the destination geographic location for each of one or more available dates during the time period; or for each available spot, a second required amount for claiming the spot, wherein both of the first required amount and the second required amount are provided to the client device, and wherein the user interface includes one or more controls that enable toggling between presentation of the first required amount and the second required amount independent of additional network requests. Other implementations of this aspect include corresponding apparatus, systems, and computer programs, configured to perform the aspects of the methods, encoded on computer storage devices.

These and other embodiments can each optionally include one or more of the following features. Some aspects include providing, to the client device, segment information for each of the one or more available spots. The segment information for each available spot can include a date on which the existing shared private jet segment that includes the available spot is scheduled to travel the private jet route. The application can present a calendar interface that depicts, for each date in the calendar for which an available spot has been identified, the second required amount for the available spot identified for the date.

Some aspects include providing, to the client device and for each date during the given time period, data identifying (i) one or more types of private jets available on the date and, for each type of private jet available on the date, a respective required amount to create a client-initiated private jet segment using the type of private jet available on the date. The application can present a calendar interface that depicts, for each date in the calendar for which a client-initiated private segment is eligible to be created, a given first required amount for a given type of private jet that is available on the date. The given first required amount can include a lowest first required amount among first required amounts for the one or more types of jets available on the date.

Some aspects include updating a calendar user interface to present multiple dates within a calendar. The one or more controls enable toggling between a first view in which a respective first required amount is presented for each of the multiple dates and a second view in which a respective second required amount is presented for each of the multiple dates.

Particular embodiments of the subject matter described in this specification can be implemented so as to realize one or more of the following advantages. A universal private jet search engine described in this document provides responses to queries for private jet travel that include data related to available private jets for which new client-initiated charter segments can be created by the client and available spots on existing private jet segments, such as existing shared charter segments. This enables clients to view information for individual spots and full charter segments efficiently and without having to submit multiple queries with different parameters or using multiple different search interfaces, thereby reducing network traffic, bandwidth consumption, computing resources for responding to queries, computing resources for receiving responses to the queries, and battery power consumed in transmitting and receiving data. The unique user interfaces and transitions between the user interfaces also enables a client to make quick comparisons between data related to individual spots and full charters, thereby enabling the clients to make more informed decisions with the necessary information by simply switching back and forth between two different views, rather than having to iteratively submit requests, which would result in the use of more processing resources and network traffic.

By providing the data for both spots and full charters in response to a single query, e.g., in one data transmission or a few transmissions in a short period of time, this reduces the latency in switching between views of information about available spots and information about new client-initiated charter segments, which can reduce errors in a mobile application that occur due to excess latency. This also reduces the computation burden placed on the search engine by reducing the total number of queries that the search engine must process and provide results. Aggregated over thousands (or millions) of users, this results in significant computational savings for the search engine and reduces the amount of network bandwidth that would otherwise be consumed to transmit the additional queries and responses to those queries.

The details of one or more embodiments of the subject matter described in this specification are set forth in the accompanying drawings and the description below. Other

BRIEF DESCRIPTION OF THE DRAWINGS

Like reference numbers and designations in the various drawings indicate like elements.

DETAILED DESCRIPTION

This document describes methods, systems, devices, and computer readable media that facilitate the search for private jet segments and spots on private jet segments, and the creation of client-initiated segments. As used throughout this document, a segment refers to a flight between an origin and a destination. The term segment refers to any type of flight that carries clients, including shuttles (e.g., a flight between a set of locations specified by the service provider) and charters (e.g., a flight between two locations freely specified by a client).

The segment can be initiated by a client (e.g., a member of a service and/or a user of an application that facilitates creation of the segment), and made available to other clients, for example, by way of a native mobile application (or another appropriate interactive environment, such as a web interface). The aircraft used to travel between the origin and destination is typically a non-commercial aircraft (e.g., a private jet). While any appropriate type of aircraft (e.g., a propeller aircraft, a jet aircraft, or a rotorcraft) can be used, they will be collectively referred to using the term "jet" for brevity. A spot refers to seat or other appropriate area of occupancy for a client on a jet that is used for the segment.

As described in more detail below, the efficient creation of client-initiated segments involves a real-time interaction between the client that is initiating the segment and the automated computing system that is facilitating the creation of the client-initiated segment, which is also simply referred to herein as a segment for brevity. One aspect of this is enabling clients to search for information about new client-initiated segments that can be created and customized by the client and available spots on existing segments, e.g., segments created by other clients and made available to other clients. For example, a client can search for information about private jet charters from an origin to a destination. In response, a search engine can provide information about new charters that can be created and customized by the client and information available spots on existing shared charters (or other types of segments) from the origin to the destination. The information about both options can be presented in a user interface that allows the client to easily compare the two options, e.g., by simply switching views, without submitting multiple different queries and without having to wait for additional data to be downloaded from a remote server.

Figure 1:
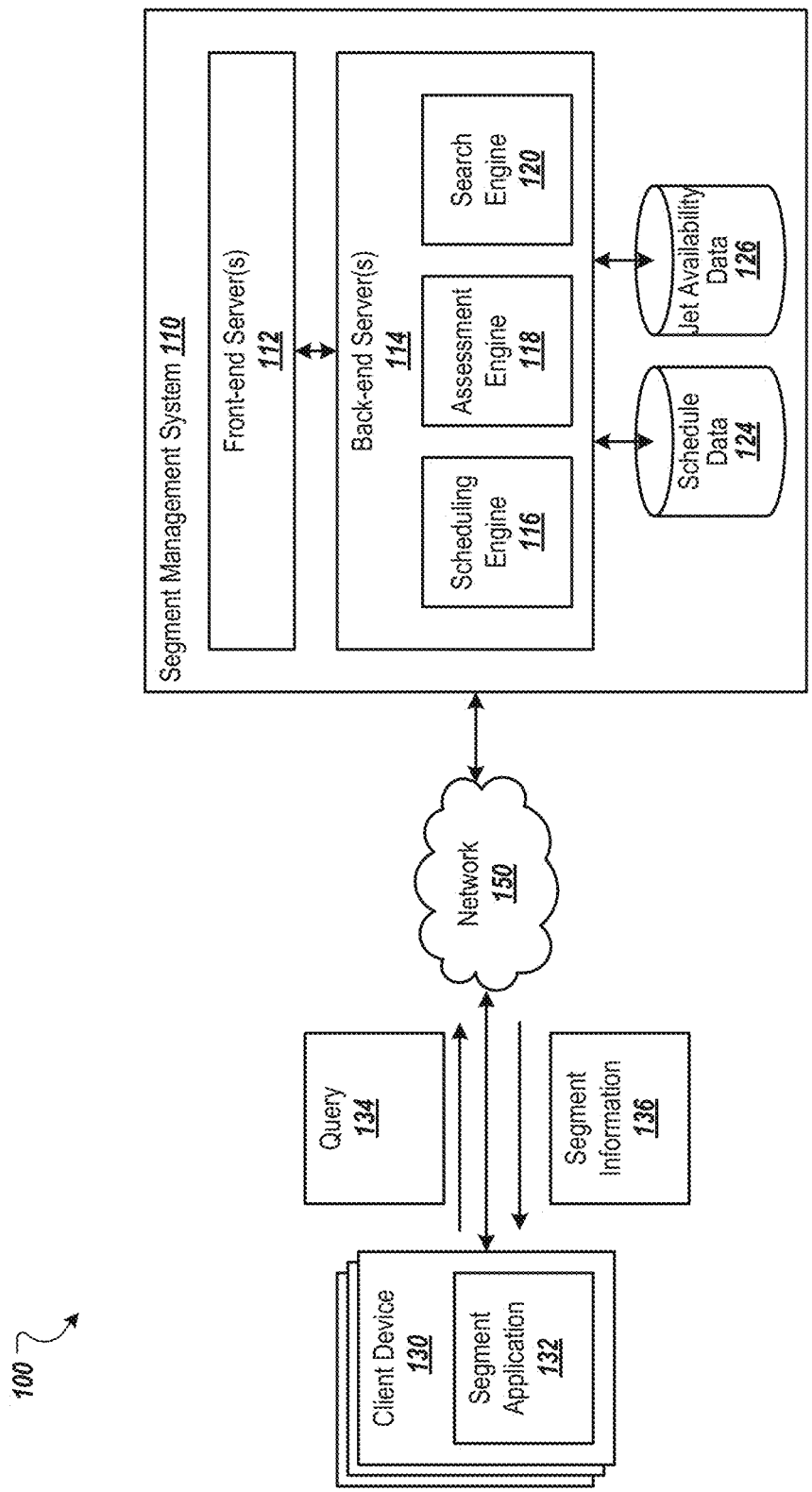
FIG. 1 is a block diagram of an example environment in which a segment management system enables clients to search for and create private jet segments.

FIG. 1 is a block diagram of an example environment 100 in which a segment management system 110 enables clients to search for and create private jet segments. The example environment 100 includes a network 150, such as a local area network (LAN), a wide area network (WAN), the Internet, a mobile network, or a combination thereof. The network 150 connects client devices 130 of clients with the segment management system 110. The example environment 100 may include many different client devices 130.

The segment management system 110, which can be operated and maintained by a segment service provider, allows users to arrange transportation on segments provided by the segment service provider. The segment service provider can provide scheduled segments between origins and destinations. The segment service provider can also allow clients (e.g., members of the segment service provided by the segment service provider) to initiate segments with custom attributes (e.g., custom departure date, origin and/or departure airport, destination and/or destination airport, time of day of departure, and/or type of jet). For example, a client may want to travel from an origin to a destination on a day in which the scheduled segment(s) from the origin to the destination are full or on a day that no segments are scheduled from the origin to the destination. In this example, the client can initiate a segment from the origin to the destination on the day and/or time that the client wants to travel. A client that initiates a segment is also referred to as a creator.

The segment management system 110 can enable clients to create different types of private jet segments including, for example, private charters for which spots are not made available to other clients, shared charters for which the client that created the charter segment is making one or more spots on the charter segment available to other clients (e.g., for purchase) through a platform managed by the segment management system 110, and crowdfunded charters that are initiated by a client and contingent on at least a specified number of spots being claimed by one or more other clients (or the creating client) before the segment will be confirmed. The segment management system 110 can provide notifications to others when shared segments are created, e.g., when crowdfunded segments are created. The notifications can be provided to clients that are likely to be interested in the segment, e.g., based on a Global Positioning System (GPS) on mobile devices of the clients indicating that they are (or frequently are) in a location of departure or arrival for the segment.

A client can initiate and manage segments, claim a spot on a segment, manage other travel arrangements with the segment management system 110, and/or perform other appropriate tasks related to the segment management system 110 using a client-side application 132 executed on the client's client device 130. The application 132 can transmit data to, and receive data from, the segment management system 110 over the network 150. The application 132 can be implemented as a native application developed for a particular platform or a particular device, web browser that provides a web interface, or another appropriate type of application. The application 132 can include custom code and logic that provides the functionality described in this document.

Figure 2A:
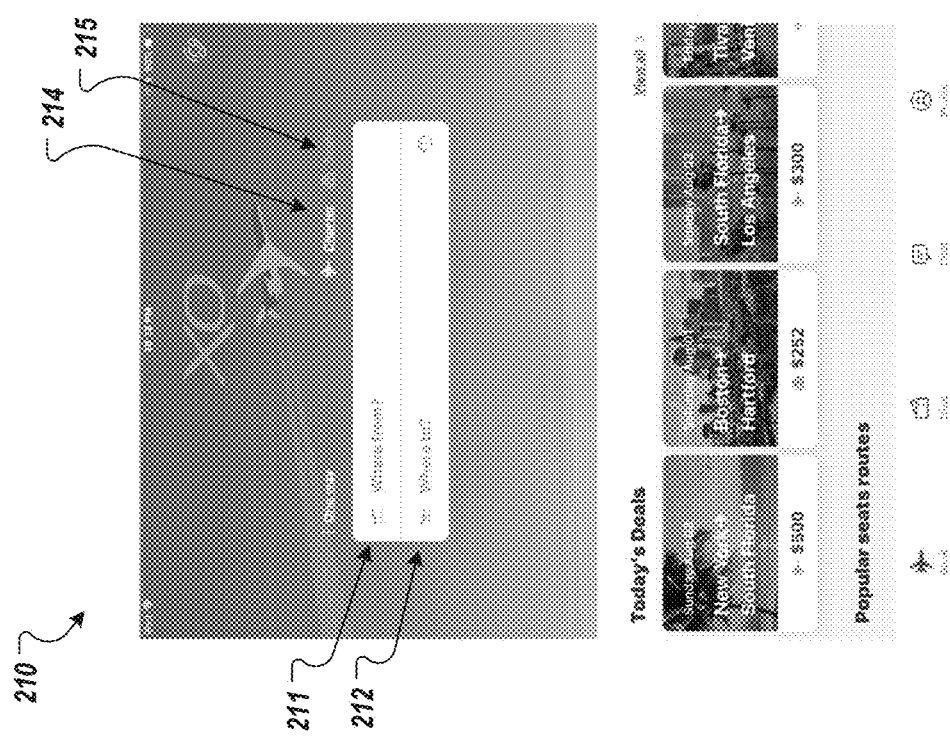
FIGS. 2A-2C are illustrations of example interactive graphical interfaces for searching for private jet segments.
Figures 2B, 2C:
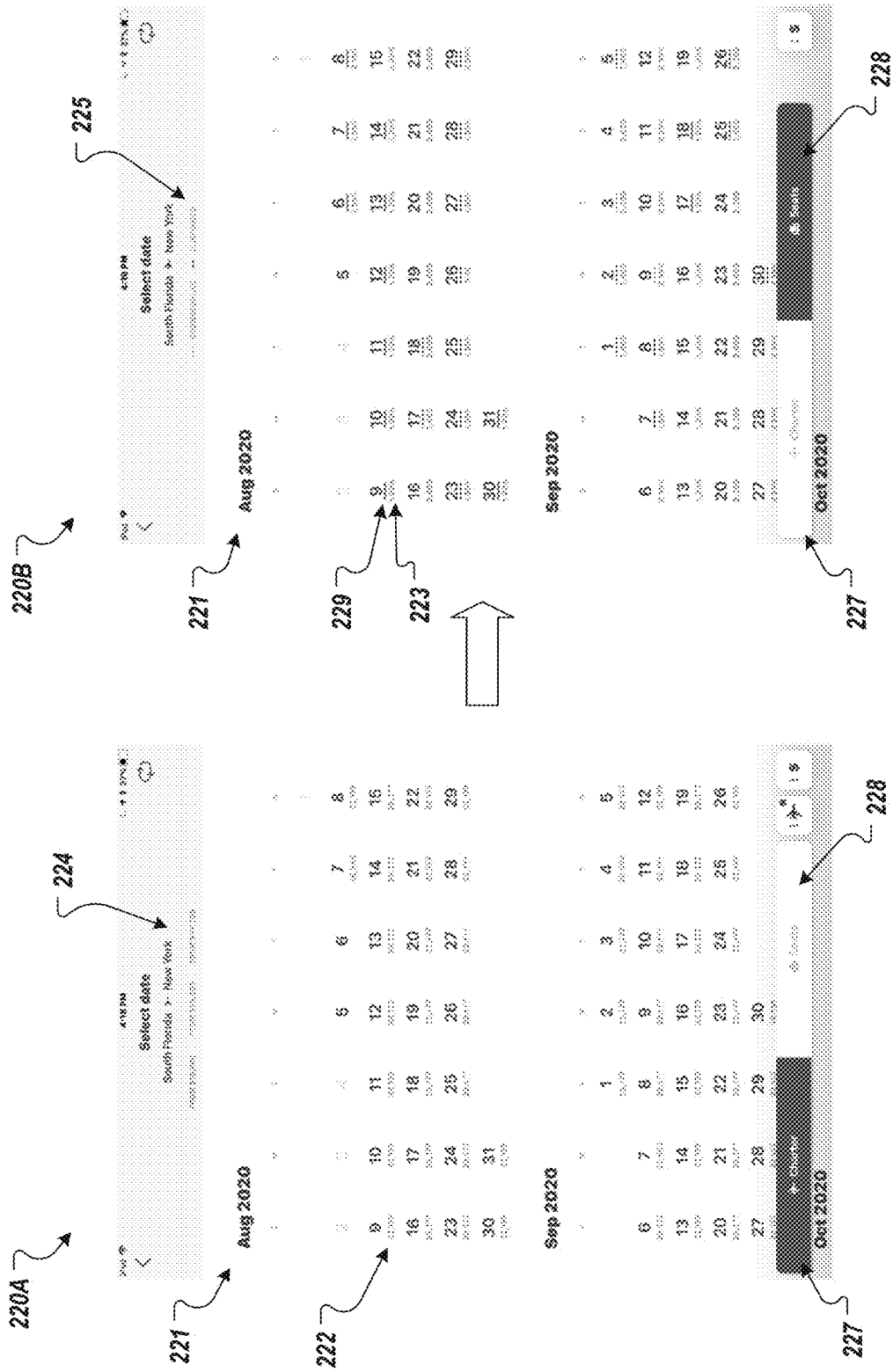

The application 132 can present and detect user interactions with various graphical user interfaces that allow the client to search for segments, create segments (e.g., create a new custom charter segment), manage segments (e.g., make a charter shared and make spots available to other clients), and/or claim a spot on segments. Some example interfaces generated and/or presented by the application 132 are illustrated in FIGS. 2A-2C and described in detail below. Some of the interfaces can be generated and/or updated by the segment management system 110.

The segment management system 110 includes one or more front-end servers 112 and one or more back-end servers 114, which can each include a computer that includes one or more processors. The front-end servers 112 can transmit data to, and receive data from, client devices 130 over the network 150. For example, the front-end servers 112 can provide, to the application 132 of a client's device 130, interfaces or data for presentation with the interfaces. The front-end servers 112 can also receive data specifying user interactions with the interfaces of the application 130, such as queries 134 enter by the client and/or attributes of a segment initiated by the client. The front-end servers 112 can update the interfaces, provide new interfaces, and/or update the data presented by the interfaces based on user interactions with the application 132.

The front-end servers 112 can also communicate with the back-end servers 114. For example, the front-end servers 112 can identify data that is to be processed by the back-end servers 114, e.g., data specifying queries received from client devices 130 and/or attributes of new client-initiated segments, and provide the identified data to the back-end servers 114. The front-end servers 112 can also receive, from the back-end servers 114, data for a particular client and transmit the data to the client device 130 of the particular client over the network 150.

The back-end servers 114 include a segment scheduling engine 116, an assessment engine 118, and a search engine 120. As used herein, the term engine refers to a data processing apparatus that performs a set of tasks. The segment scheduling engine 116 manages the creation, confirmation, and/or cancellation of segments, including client-initiated segments. The segment scheduling engine 116 can receive data specifying attributes of a segment initiated by a client and create the segment within the segment management system 110. For example, a client that uses a client device 130 can interact with the application 132 to initiate a segment and specify attributes of the segment. The attributes can include a departure geographic identifier (e.g., an origin city and/or airport identifier, e.g., airport code), a destination geographic identifier (e.g., a destination city and/or airport identifier, e.g., airport code), a departure date (which can include a date and/or time) at which the segment will depart from the origin, a type of jet (e.g., light, midsize, heavy, propeller, rotorcraft, etc.), a number of spots the client wants to claim on the segment (e.g., if the segment is a shared charter segment), and/or other appropriate attributes.

The application 132 can generate a segment request and cause the client device 130 to transmit the segment request to the segment management system 110 over the network 150. The segment request can include one or more of the client-specified attributes.

The search engine 120 enables the client to search for information about private jet segments. The segment application 132 can provide one or more user interfaces that allow the client to enter conditions for search parameters ("search conditions"), such as a departure geographic identifier that identifies a departure geographic location from which the client would like for the segment to depart and a destination geographic identifier that identifies a destination geographic location to which the client would like for the segment to travel. The segment application 132 can allow the client to enter other search parameters, e.g., in addition to or in place of, the departure geographic identifier and the destination geographic identifier. For example, the segment application 132 can enable the client to specify conditions of other attributes, such as departure date, type of jet, number of spots on the jets, amenities of the jets, etc.

The segment application 132 can generate a query 134 that includes search conditions and transmit the query 134 to the segment management system 110. The search engine 120 can use the search conditions to identify multiple types of options for the client. Advantageously, the search engine 120 can identify information about new, but not yet created, client-initiated segments that can be initiated and customized by the client and available spots on existing segments, e.g., shared charter segments, that the client can claim. That is, the search engine 120 can provide information about both available spots on existing segments and the new charters that the client can create. Such information can include a required amount (e.g., monetary cost) to either create the new segment or claim a spot on an existing segment. The search engine 120 can access a schedule data storage unit 124 and a jet availability data storage unit 126 to query and identify such information. The schedule data storage unit 124 and the jet availability data storage unit 126 can each include one or more databases (or other appropriate data storage structures) stored in one or more non-transitory data storage media (e.g., hard drive(s), flash memory, etc.).

The segment data storage unit 124 can store data for each segment that is provided by the segment service provider. The segment data storage unit 124 can store data for each client-initiated segment, e.g., for each client-initiated non-shared charter segment, each client-initiated shared charter segment, and each client-initiated crowdfunded charter segment. The data for each segment can include the departure geographic identifier for the segment, the destination geographic identifier for the segment, the departure date for the segment (including the time of day of departure), the type of jet and/or an identifier of the actual jet being used for the segment, an identifier for each client that has claimed a spot on the segment (e.g., if the segment is a shared or crowdfunded charter segment), amenities of the jets, and/or other appropriate segment data. The data for each segment can also include whether there are any available spots on the segment that can be claimed by other clients and, if so, the quantity of available spots.

The data for each segment can also include data specifying the type of segment, e.g., whether the segment is a shared, non-shared, or crowdfunded charter segment. For crowdfunded charter segments, the data for the segments can include whether the segment has been confirmed by having a sufficient number of spots on the segment being claimed and/or the number of remaining spots that have to be claimed before the segment is confirmed.

For segments that have one or more available spots, the data for the segments can include a required amount for claiming the spot(s). The required amount is an amount that a client is required to submit to the segment service provider for claiming the spot. As this required amount can change over time based on changing conditions, an assessment engine 118 (described below) can update the amounts periodically or in real-time, or determine/update the required amounts at query time.

The jet availability data storage unit 126 can store data for available jets and/or available types of jets for each geographic location and/or each route between two geographic locations. For example, some geographic locations or routes may have limited types of jets available based on the jets that operate in those locations, the size of the airports in those locations, and/or other factors. The jet availability data can include, for each geographic location and/or route, data identifying the types of jets that can be used for the location or route, any specific jets that are eligible for the location or route, and for each jet or type of jet, the dates that the jets are available for that location or route. This data can be updated regularly, e.g., by the scheduling engine 116, in response to the jets being assigned to scheduled segments.

The jet availability data can also include for each jet or type of jet, a required amount for using the jet for each route. The required amount is an amount that a client is required to submit to the segment service provider for initiating a segment using the jet or type of jet for the route. For example, a heavy jet may have a higher required amount than a light jet. This data can be in terms of unit time, e.g., a dollar per minute or dollar per hour flight time. As the required amount for jets can also be dynamic, e.g., higher for segments created closed to departure time, the assessment engine 118 (described below) can update the amounts periodically or determine/update the required amounts at query time. The required amounts can vary for different days and can be shown on a calendar interface, as described below.

The search engine 120 can query the schedule data and the jet availability data to identify segments and/or available jets that meet the search conditions. For example, if the search conditions include a departure geographic identifier of "South Florida" and a destination geographic identifier of "New York," the search engine 120 can identify, in the schedule data 124, each scheduled segment that is scheduled to travel from South Florida to New York. The search engine 120 can then identify, on these segments, any available spots and obtain the information for each available spot. The information can include the date of the segment, the itinerary for the segment (e.g., departure time, departure airport, destination airport, etc., the number of spots available, and/or the required amount for each spot). The search engine 120 can include the information for each available spot in segment information 136 provided to the segment application 132 in response to the query.

The search engine 120 can also identify, in the jet availability data 126, available jets or types of jets that meet the search conditions. Continuing the previous South Florida to New York example, the search engine 120 can identify private jets or types of private jets that are available for that route, e.g., over the course of a particular time period such as one month, two months, etc. The search engine 120 can then identify, in the jet availability data, information for these jets or types of jets. This information can include the number of spots on the jet and a required amount for the jet or type of jet, e.g., for one or more available dates during the time period. The search engine 120 can include this information in the segment information 136 provided to the segment application 132 in response to the query.

The search engine 120 can transmit the segment information 136 to the segment application 132 over the network 150. The segment application 132 can then present the information to the client. Some example user interfaces for presenting the information are illustrated in FIGS. 2B and 2C and described below.

The client can then select an available spot on one of the existing scheduled segments for which a spot is available or create a custom client-initiated segment with custom attributes based on the jets or types of jets available for the route. In response, the segment application 132 can provide the data to the segment scheduling engine 116.

The segment scheduling engine 116 can receive the data and update the schedule data based on the data. For example, if the client claimed a spot on an existing segment, the scheduling engine 116 can assign that spot to the client and update the number of available spots on the segment in the schedule data. If the client created a new client-initiated segment, the scheduling engine 116 can create the appropriate segment within the segment management system 110 based on the data and the attributes received from the client device 130. The segment scheduling engine 116 can also store the data for the created segment in a schedule data storage unit 124.

When a new client-initiated shared segment is created, the segment scheduling engine 116 can notify other clients of the created segment, e.g., if the segment is a shared charter segment. In some implementations, clients can view the available spots on various segments from an origin to a destination. For example, the application 132 can present the required amounts for spots on segments from an origin to a destination using a calendar interface. A client, e.g., the client associated with (e.g., logged into the application 132 on) the client device 130, can request a spot on a shared charter segment using the application 132.

As mentioned above, the segment management system 110 also includes an assessment engine 118. The assessment engine 118 can determine an amount that clients are required to submit to create a new client-initiated segment and the amount required to claim a spot on an existing segment. The amount for a new segment can be based on various factors, such as the type of jet, the departure and destination geographic identifiers, the departure date, the departure airport, the destination airport, the time of day of departure, the duration of time between the time the segment is initiated and the departure date, the type of segment (e.g., conditional or confirmed), and/or other appropriate factors. The amount to claim a spot on an existing segment can be based on the total required amount for the full segment, the amount of time before departure, the number of spots available on the segment and any similar segments, and/or other appropriate factors.

When providing the segment information 136 to the segment application 132, the scheduling engine 116 can obtain the required amounts for the various spots, jets, or types of jest and provide this information with the rest of the segment information 136. This enables the segment application 132 to present up to date required amounts that can change frequently based on the various factors.

FIGS. 2A-2C are illustrations of example interactive graphical interfaces for searching for private jet segments. The interfaces can be used to find available spots on existing segments and information about jets or types of jets that available for creation of new client-initiated custom segments, e.g., new shared, non-shared, or crowdfunded segments.

Referring to FIG. 2A, a route selection interface 210 enables the user to configure a query by selecting a route for the segment. The route selection interface 210 includes a departure selection element 211 and a destination selection element 212. In some implementations, the client can enter, e.g., type, an airport or name of a geographic region (e.g., city) into the departure selection element 211 and the destination selection element 212. In some implementations, user interaction with, e.g., selection of, the departure selection element 211 or the destination selection element 212 causes the segment application 132 to present an airport selection interface that enables the client to select an airport from a list of airports based on the text entered by the client.

The route selection interface 210 includes a charter selector control 214 and a spot selector control 215. This enables the client to select whether to view information about new charters (or other client-initiated segments) or available spots on existing segments. For example, the client can interact with, e.g., select, the charter selector control 214 to select to view information about new charters or interact with the spot selector control 215 to view information about available spots on existing segments. This can control which of the two types of data is initially displayed to the client after the query is processed.

Once the client has entered or selected an origin and destination for the route, the segment application 120 can generate a query based on the origin and destination. For example, the segment application 132 can generate a query that includes, as search criteria, a departure geographic identifier (e.g., for a geographic location or airport) and a destination geographic identifier (e.g., for a geographic location or airport). The segment application 132 can send the query to the search engine 120.

In response, the search engine 120 can identify jets and/or types of jets that satisfy the search criteria and/or available spots on existing segments that satisfy the search criteria. For example, if the search criteria indicates a departure identifier "Los Angeles" and a destination identifier "New York," the search engine 120 can surface existing and/or conditional crowdfunded segments from Los Angeles to New York that have an available spot, as well as information for creating a new segment from Los Angeles to New York.

The search engine 120 can then provide information about these jets, types of jets, and available spots (as described above) to the segment application 132. The search engine 120 can provide information about new client-initiated segments and available spots on existing segments independent of which selector control 214 or 215 is selected. That is, information for both existing segments and non-existing segments that the client can create can be provided to the client device, independent of which type of information the client selects using the user interface 210. The segment application 120 can cache the information for the non-selected control so that the client can quickly toggle between the two views shown in FIGS. 2B and 2C without transmitting additional requests to the search engine 120. The segment application 132 can update the route election user interface 210 to present information received from the search engine 120.

Referring to FIG. 2B, the segment application 132 can present a calendar interface 220A that presents information about jets or types of jets that are available for the route defined by the client in the route selection interface 210. In this example, the client selected (or the user interface 210 defaulted to) the charter selection control 214. In response, the segment application 132 included information for creating new client-initiated segments in the calendar interface initially. If the client had selected the spot selector control, the segment application 132 can present information for available spots in the calendar interface, as shown in FIG. 2C.

The calendar interface 220A also includes a charter selector control 227 and a spot selector control 228. The client can use these controls to toggle between viewing information for creating a new client-initiated segment and viewing information about available spots on existing segments. The segment application 120 can update the calendar interface 220A to the calendar interface 220B of FIG. 2C in response to the client selecting the spot selector control 228. That is, the segment application 120 can replace the information about new client-initiated segments with information about available spots on existing segments in response to the client selecting the spot selector control 228. As described above, the information for updating the user interface can be stored locally in a cache to reduce the latency in transitioning the data at the client device.

Similarly, the segment application 132 can update the calendar interface 220B to the calendar interface 220A in response to the client selecting the charter selector control 227 while the user interface 220B is being presented. That is, the segment application 132 can replace the information about available spots on existing segments with information about new client-initiated segments in response to the client selecting the charter selector element 227.

The calendar interface 220A includes a calendar 221 that includes a set of dates. In this example, the calendar 221 includes two months, but other time periods can also be presented, such as one week, one month, three months, etc. For at least some of the dates, the calendar interface 221 includes a required amount 222 for creating a new client-initiated segment for that date and for the route defined by the client using the route selection interface 210. For example, the required amount for August 9th is $22, 177.

In some implementations, the required amount 222 presented for each date is a lowest required amount for that date. For example, there may be multiple jets or multiple types of jets available for the date, each having a different required amount. The segment application 132 can determine which jet or type of jet has the lowest required amount and present the lowest required amount under the date (or in another appropriate position).

In some implementations, the required amounts have different visual characteristics based on the magnitudes of the required amounts. For example, a first color can represent a first required amount range, a second color can represent a second required amount range, and a third color can represent a third required amount range. Of course, more or fewer ranges and/or different visual characteristics can be used. The calendar interface 220A includes a legend 224 that indicates the ranges for each visual characteristic. By presenting the required amounts using the calendar interface and using the different visual characteristics, a client can quickly view the relative amounts between various days without navigating to multiple interfaces to view the amount for each day. If the client's travel dates are flexible, the client can quickly find the best date for the new segment, e.g., by scanning for dates having required amounts in a particular color.

To create a custom client-initiated segment on a particular date, the client can interact with the date, e.g., select the date. In response, the segment application 132 can present another user interface that enables the client to select other attributes, such as the type of jet (e.g., one with a higher required amount), time of day of departure, particular airports etc., and to confirm the new segment.

In some implementations, the required amount for a new segment can be based on the supply and demand for jets along the route for which information is being displayed. For example, if there are excess jets at the departure location and insufficient jets at the destination location to meet demand, the required amount for the route can be lower to encourage clients to create segments along the route. The required amounts can be updated by a user, e.g., a scheduler, or the segment management system 110 based on information specifying the relative demand. The levels of demand used for the required amounts can be for particular time periods. For example, if additional jets are needed at a particular location on particular days, the required amounts for new routes to the particular location can be reduced to encourage clients to create new segments to the particular location on or just before those days.

Referring to FIG. 2C, the calendar interface 220B includes the calendar 221, the charter selector control 227, and the spot selector control 228. In this view, the calendar 221 includes, for at least some dates, a required amount for claiming a spot on an existing segment that departs on that date. For example, the required amount for claiming an available spot on an existing segment on August 9th is $1695.

In some implementations, the required amount 223 presented for each date is a lowest required amount for that date. For example, there may be multiple existing segments with at least one available spot traveling on the defined route on a particular date. The segment application 132 can determine which segment has the lowest required amount and present the lowest required amount under the date (or in another appropriate position).

As described above, the segment management system 110 can enable clients to create various types of segments. For dates that have an existing segment with an available spot, the segment application 132 can present a segment type indicator 229 that indicates the type of segment that is available on that date. In this example, the segment type indicator 229 is a line under the date. The color of the line can represent the type of segment, as shown by the legend 225. For example, a segment type indicator 229 in a first color can represent that there is a crowdfunded segment on a particular date and a segment type indicator 229 in a second color can represent that there is a confirmed segment on the particular date.

For dates that do not have an existing segment with an available spot, the calendar interface 220B can present a required amount per spot on a crowdfunded segment that the client can create. For example, the calendar interface 220B indicates that there are no available spots on existing segments for the defined route on August 19th. However, the calendar interface 220B also indicates that the client can create a new crowdfunded segment and claim a spot on the new crowdfunded segment for $2495.

The client can interact with a date within the calendar interface 220B to claim a spot on an existing segment or initiate a new crowdfunded segment. In response, the segment application 132 can present another user interface that enables the client to select a spot on an existing segment or customize a new crowdfunded segment.

Figure 3:
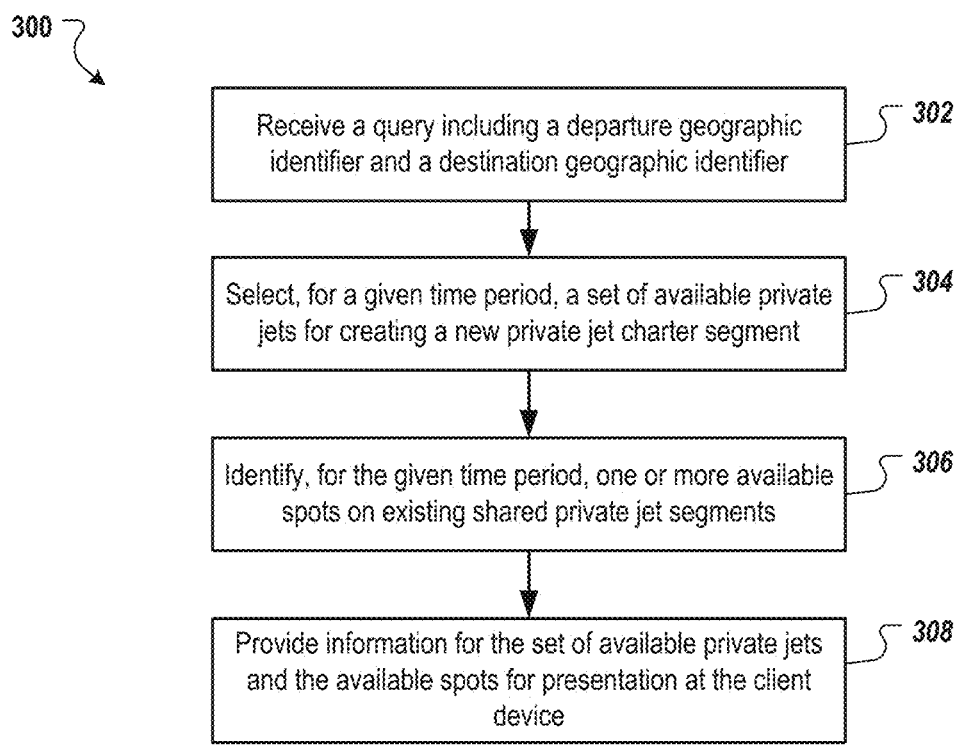
FIG. 3 is a flow chart of an example process for providing data for private jet segments in response to a query.

FIG. 3 is a flow chart of an example process 300 for creating a new private jet charter segment. Operations of the process 300 can be implemented by one or more servers (or other computing devices), such as the segment management system 110 of FIG. 1. Operations of the process 300 can also be implemented as instructions stored on a computer readable medium, e.g., non-transitory computer readable medium, where execution of the instructions by one or more servers (or other computing devices or data processing apparatus) cause the one or more servers to perform operations of the process 300.

A query is received from a client device (302). The query can include one or more search conditions, such as a departure geographic identifier and a destination geographic identifier. The departure geographic identifier can identify a departure geographic location from which a private jet will depart. The destination geographic identifier can identify a destination location at which the private jet will arrive. The client can define the search conditions using a user interface, such as the route selection user interface 210 of FIG. 2A.

A set of available private jets is selected (304). For example, a search engine can identify a set of available jets (or types of jets) that are available for the route defined by the departure geographic identifier and the destination geographic identifier. The search engine can identify the available jets or type of jets over a given time period, e.g., over the next month, two months, year, etc.

The given time period can be based on the time period for which data will be provided to the client device. For example, if the segment application will present three months of segment information without requesting more information from the search engine, the search engine can identify available jets or types of jets for the next three months.

One or more available spots on existing shared private jet segments are identified (306). For example, the search engine can identify, for the given time period, each existing segment that is scheduled to travel the defined route. For these segments, the search engine can identify any segments that have at least one available spot that another client can claim.

Information for the set of available private jets and the available spots is provided for presentation at the client device (308). For example, the search engine can identify a first required amount for each available jet (or type of jet) for each date that the jet (or type of jet) is available during the time period. The first required amount for a jet and date represents an amount required to be submitted by the client to create a new client-initiated segment for the route on the date using the jet. The information provided to the client device can include, for each jet or type of jet, the first required amount.

The search engine can also identify, for each available spot on existing segments, a second required amount for claiming the spot. The second required amount is an amount required to be submitted by the client to claim the spot. The information provided to the client device can include, for each available spot, the date that the spot is available, the type of segment that includes the available spot (e.g., confirmed or crowdfunded), the type of jet that includes the available spot, the itinerary for the segment that includes the available spot, and/or other appropriate information regarding the available spot.

As described above, a segment application running on the client device can display the information, e.g., in a calendar interface. The client can toggle between views of the calendar interface to view information about new client-initiated segments or information about available spots on existing segments. The client can then claim a spot on an existing segment or initiate a new segment by interacting with the calendar interface.

Figure 4:
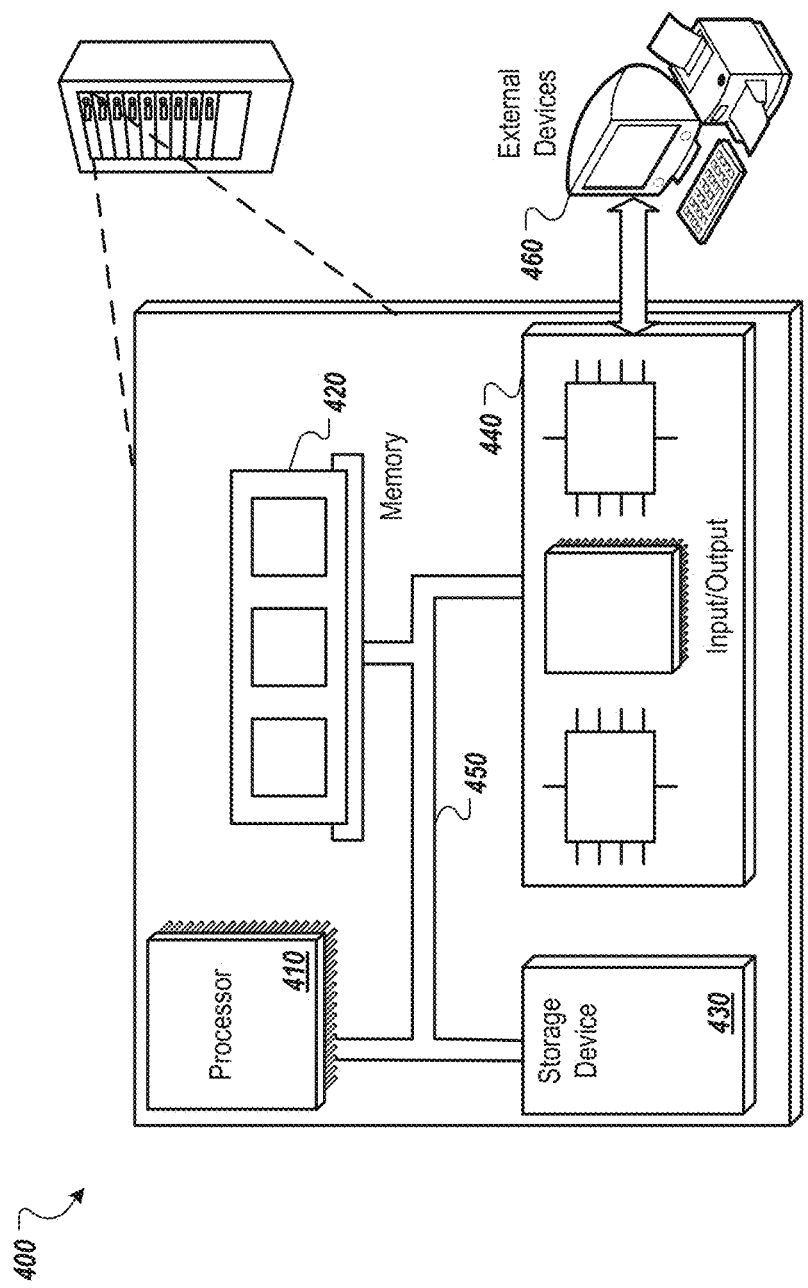
FIG. 4 is a block diagram of an example computer system.

FIG. 4 is a block diagram of an example computer system 400 that can be used to perform operations described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In some implementations, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In some implementations, the memory 420 is a volatile memory unit. In another implementation, the memory 420 is a non-volatile memory unit.

The storage device 430 is capable of providing mass storage for the system 400. In some implementations, the storage device 430 is a computer-readable medium. In various different implementations, the storage device 430 can include, for example, a hard disk device, an optical disk device, a storage device that is shared over a network by multiple computing devices (e.g., a cloud storage device), or some other large capacity storage device.

The input/output device 440 provides input/output operations for the system 400. In some implementations, the input/output device 440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to external devices 460, e.g., keyboard, printer and display devices. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving, from a client device, a query comprising a departure geographic identifier and a destination geographic identifier for a private jet route, wherein the departure geographic identifier identifies a departure geographic location from which a private jet will depart and the destination geographic identifier identifies a destination geographic location at which the private jet will arrive;
   in response to receiving the query,
      querying, for a given time period, a first database for a set of available private jets for creating a new client-initiated private jet segment using the departure geographic location to the destination geographic location of the query, wherein the first database stores data about private jets that can be scheduled for new client-initiated segments;
      querying, for the given time period, a second database different from the first database for one or more available spots on existing shared private jet segments that are scheduled to travel from the departure geographic location to the destination geographic location of the query, wherein the second database stores data about scheduled segments;
   in response to querying the first and second databases, transmitting, to the client device,
      (i) for each available private jet identified by querying the first database, a first required amount for creating a client-initiated private jet charter segment to travel from the departure geographic location to the destination geographic location for each of one or more available dates during the given time period, and
      (ii) for each available spot identified by querying the second database, a second required amount for claiming the available spot, wherein both of the first required amount and the second required amount are provided to the client device in response to receiving the query, and wherein the client device comprises a user interface that includes one or more controls that enable toggling between presentation of the first required amount within the user interface and the second required amount within the user interface without transitioning between different user interfaces and independent of additional network requests for either the first required amount or the second required amount in response to the toggling,
   wherein transmitting (i) and (ii) to the client device causes the client device to initially update the user interface at the client device with data indicative of (i) or (ii) according to a toggled control of the one or more controls selected by a user interacting with the client device;
   receiving, from the client device, data indicating a selection to create a new client-initiated private jet charter segment to travel from the departure geographic location to the destination geographic location for a date of the one or more available dates during the given time period;
in response to receiving the data indicating the selection to create the client-initiated private jet charter segment,
determining one or more clients who are likely to be interested in claiming a spot on the client-initiated private jet charter segment based on a frequency with which one or more other client devices of the one or more clients are located at the departure geographic location or the destination geographic location; and
transmitting, to the one or more clients, a notification that the client-initiated private jet charter segment is available for claiming one or more other available spots.

2. The computer-implemented method of claim 1, further comprising providing, to the client device, segment information for each of the one or more available spots, wherein the segment information for each available spot comprises a date on which the existing shared private jet segment that includes the available spot is scheduled to travel the private jet route.

3. The computer-implemented method of claim 2, wherein an application of the client device presents a calendar interface that depicts, for each date in the calendar interface for which an available spot has been identified, the second required amount for the available spot identified for the date.

4. The computer-implemented method of claim 1, further comprising providing, to the client device and for each date during the given time period, data identifying (i) one or more types of private jets available on the date and, for each type of private jet available on the date, a respective required amount to create a client-initiated private jet segment using the type of private jet available on the date.

5. The computer-implemented method of claim 4, wherein an application of the client device presents a calendar interface that depicts, for each date in the calendar interface for which a client-initiated private segment is eligible to be created, a given first required amount for a given type of private jet that is available on the date.

6. The computer-implemented method of claim 5, wherein the given first required amount comprises a lowest first required amount among first required amounts for the one or more types of jets available on the date.

7. The computer-implemented method of claim 1, further comprising updating a calendar user interface to present a plurality of dates within a calendar, wherein the one or more controls enable toggling between:
a first view in which a respective first required amount is presented for each of the plurality of dates; and
a second view in which a respective second required amount is presented for each of the plurality of dates.

8. The computer-implemented method of claim 1, wherein (i) the first required amount for each available private jet and (ii) the second required amount for each available spot each include respective visual characteristics displayed on the user interface according to a magnitude of a respective amount.

9. The computer-implemented method of claim 1, wherein receiving, from the client device, the data indicating the selection further comprises receiving, from the client device, the data indicating the selection to claim a given available spot from the one or more available spots on a given existing private jet segment that is scheduled to travel from the departure geographic location to the destination geographic location.

10. The computer-implemented method of claim 1, wherein the first required amount and the second required amount are transmitted to the client device in a single data transmission.

11. A computer-implemented system, comprising:
one or more computers; and
one or more computer memory devices interoperably coupled with the one or more computers and having tangible, non-transitory, machine-readable media storing one or more instructions that, when executed by the one or more computers, perform operations comprising:
receiving, from a client device, a query comprising a departure geographic identifier and a destination geographic identifier for a private jet route, wherein the departure geographic identifier identifies a departure geographic location from which a private jet will depart and the destination geographic identifier identifies a destination geographic location at which the private jet will arrive;
in response to receiving the query,
querying, for a given time period, a first database for a set of available private jets for creating a new client-initiated private jet segment using the departure geographic location to the destination geographic location of the query, wherein the first database stores data about private jets that can be scheduled for new client-initiated segments;
querying, for the given time period, a second database different from the first database for one or more available spots on existing shared private jet segments that are scheduled to travel from the departure geographic location to the destination geographic location of the query, wherein the second database stores data about scheduled segments;
in response to querying the first and second databases, transmitting, to the client device,
(i) for each available private jet identified by querying the first database, a first required amount for creating a client-initiated private jet charter segment to travel from the departure geographic location to the destination geographic location for each of one or more available dates during the given time period, and
(ii) for each available spot identified by querying the second database, a second required amount for claiming the available spot, wherein both of the first required amount and the second required amount are provided to the client device in response to receiving the query, and wherein the client device comprises a user interface that includes one or more controls that enable toggling between presentation of the first required amount within the user interface and the second required amount within the user interface without transitioning between different user interfaces and independent of additional network requests for either the first required amount or the second required amount in response to the toggling,
wherein transmitting (i) and (ii) to the client device causes the client device to initially update the user interface at the client device with data indicative of (i) or (ii) according to a toggled control of the one or more controls selected by a user interacting with the client device;

receiving, from the client device, data indicating a selection to create a new client-initiated private jet charter segment to travel from the departure geographic location to the destination geographic location for a date of the one or more available dates during the given time period;

in response to receiving the data indicating the selection to create the client-initiated private jet charter segment, determining one or more clients who are likely to be interested in claiming a spot on the client-initiated private jet charter segment based on a frequency with which one or more other client devices of the one or more clients are located at the departure geographic location or the destination geographic location; and transmitting, to the one or more clients, a notification that the client-initiated private jet charter segment is available for claiming one or more other available spots.

12. The computer-implemented system of claim 11, wherein the operations further comprise providing, to the client device, segment information for each of the one or more available spots, wherein the segment information for each available spot comprises a date on which the existing shared private jet segment that includes the available spot is scheduled to travel the private jet route.

13. The computer-implemented system of claim 12, wherein an application of the client device presents a calendar interface that depicts, for each date in the calendar interface for which an available spot has been identified, the second required amount for the available spot identified for the date.

14. The computer-implemented system of claim 11, wherein the operations further comprise providing, to the client device and for each date during the given time period, data identifying (i) one or more types of private jets available on the date and, for each type of private jet available on the date, a respective required amount to create a client-initiated private jet segment using the type of private jet available on the date.

15. The computer-implemented system of claim 14, wherein an application of the client device presents a calendar interface that depicts, for each date in the calendar interface for which a client-initiated private segment is eligible to be created, a given first required amount for a given type of private jet that is available on the date.

16. The computer-implemented system of claim 15, wherein the given first required amount comprises a lowest first required amount among first required amounts for the one or more types of jets available on the date.

17. The computer-implemented system of claim 11, wherein the operations comprise updating a calendar user interface to present a plurality of dates within a calendar, wherein the one or more controls enable toggling between:

a first view in which a respective first required amount is presented for each of the plurality of dates; and a second view in which a respective second required amount is presented for each of the plurality of dates.

18. A non-transitory computer storage medium encoded with a computer program, the computer program comprising instructions that when executed by a data processing apparatus cause the data processing apparatus to perform operations comprising:

receiving, from a client device, a query comprising a departure geographic identifier and a destination geographic identifier for a private jet route, wherein the departure geographic identifier identifies a departure geographic location from which a private jet will depart and the destination geographic identifier identifies a destination geographic location at which the private jet will arrive;

in response to receiving the query, querying, for a given time period, a first database for a set of available private jets for creating a new client-initiated private jet segment using the departure geographic location to the destination geographic location of the query, wherein the first database stores data about private jets that can be scheduled for new client-initiated segments;

querying, for the given time period, a second database different from the first database for one or more available spots on existing shared private jet segments that are scheduled to travel from the departure geographic location to the destination geographic location of the query, wherein the second database stores data about scheduled segments;

in response to querying the first and second databases, transmitting, to the client device, (i) for each available private jet identified by querying the first database, a first required amount for creating a client-initiated private jet charter segment to travel from the departure geographic location to the destination geographic location for each of one or more available dates during the given time period, and (ii) for each available spot identified by querying the second database, a second required amount for claiming the available spot, wherein both of the first required amount and the second required amount are provided to the client device in response to receiving the query, and wherein the client device comprises a user interface that includes one or more controls that enable toggling between presentation of the first required amount within the user interface and the second required amount within the user interface without transitioning between different user interfaces and independent of additional network requests for either the first required amount or the second required amount in response to the toggling, wherein transmitting (i) and (ii) to the client device causes the client device to initially update the user interface at the client device with data indicative of (i) or (ii) according to a toggled control of the one or more controls selected by a user interacting with the client device;

receiving, from the client device, data indicating a selection to create a new client-initiated private jet charter segment to travel from the departure geographic location to the destination geographic location for a date of the one or more available dates during the given time period;

in response to receiving the data indicating the selection to create the client-initiated private jet charter segment, determining one or more clients who are likely to be interested in claiming a spot on the client-initiated private jet charter segment based on a frequency with which one or more other client devices of the one or more clients are located at the departure geographic location or the destination geographic location; and transmitting, to the one or more clients, a notification that the client-initiated private jet charter segment is available for claiming one or more other available spots.

19. The non-transitory computer storage medium of claim 18, wherein the operations further comprise providing, to the client device, segment information for each of the one or more available spots, wherein the segment information for each available spot comprises a date on which the existing shared private jet segment that includes the available spot is scheduled to travel the private jet route.

20. The non-transitory computer storage medium of claim 19, wherein an application of the client device presents a calendar interface that depicts, for each date in the calendar interface for which an available spot has been identified, the second required amount for the available spot identified for the date.

* * * * *